United States Patent
Wada (10) Patent No.: US 7,315,425 B2
(45) Date of Patent: Jan. 1, 2008

(54) ZOOM LENS AND IMAGE PROJECTION APPARATUS HAVING THE SAME

(75) Inventor: Ken Wada, Tochigi-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 299 days.

(21) Appl. No.: 11/099,905

(22) Filed: Apr. 5, 2005

(65) Prior Publication Data

US 2005/0219711 A1 Oct. 6, 2005

(30) Foreign Application Priority Data

Apr. 6, 2004 (JP) ............................. 2004-112550

(51) Int. Cl.
G02B 15/14 (2006.01)
(52) U.S. Cl. ................... 359/689; 359/684; 359/686; 359/690
(58) Field of Classification Search ............... 359/689, 359/684, 686, 690
See application file for complete search history.

(56) References Cited

U.S. PATENT DOCUMENTS

| 5,745,303 A | 4/1998 | Ohno |
| 6,084,719 A | 7/2000 | Sugawara et al. |

FOREIGN PATENT DOCUMENTS

| JP | H05-313220 | 11/1993 |
| JP | 06094996 A * | 4/1994 |
| JP | 6-160709 A | 6/1994 |
| JP | 7-333500 A | 12/1995 |
| JP | H08-051248 | 2/1996 |
| JP | 2001-108900 A | 4/2001 |
| JP | 2003-273456 | 9/2003 |
| JP | 2004-70306 A | 3/2004 |

OTHER PUBLICATIONS

A.J.Damner et al., "Coupled-defect photonic crystal vertical cavity surface emitting lasers", Elextronics Letters, 2003, vol. 39, pp. 1323-1324.
English Abstract and English computer translated version of JP 2003-273456.
English Abstract and English computer translated version of JP H05-313220.
English Abstract and English computer translated version of JP H08-051248.

* cited by examiner

Primary Examiner—Scott J. Sugarman
Assistant Examiner—James R Greece
(74) Attorney, Agent, or Firm—Morgan & Finnegan, LLP (57) ABSTRACT

A zoom lens of the invention has three lens groups. In the zoom lens, magnification change is performed by moving only one lens group among the three lens groups, and focus adjustments is performed by moving one of a first lens group and a second lens group counted from an enlargement conjugate side among the three lens groups. In addition, the zoom lens is approximately telecentric on reduction conjugate side thereof.

12 Claims, 7 Drawing Sheets

ZOOM LENS AND IMAGE PROJECTION APPARATUS HAVING THE SAME

BACKGROUND OF THE INVENTION

1. Field of the Invention

The present invention relates to a zoom lens and an image projection apparatus having the zoom lens which are, for instance, suitable for a liquid crystal projector apparatus that magnifies and throws an image displayed by an image display element, such as a light valve, onto a screen.

2. Related Background Art

Conventionally, a liquid crystal projector has been widely used in a conference, presentation, or the like as an image projection apparatus that throws an image of a personal computer or the like onto a large screen, thereby allowing people to view the image.

There is a demand that an optical system applied to the liquid crystal projector is capable of projecting an image whose brightness is uniform and luminance is high, so it is desired that a pupil on a liquid crystal display element (reduction conjugate) side is located at infinity, that is, the pupil is so-called telecentric.

Conventionally, as a large-aperture and high-resolution projection lens for the liquid crystal projector, various zoom lenses have been proposed which are capable of compensating for various aberrations by arranging five or six lens groups under an appropriate refractive power condition (Japanese Patent Application Laid-Open No. 2004-70306).

Among the zoom lenses, a projection zoom lens for a liquid crystal projector is known which is composed of six lens groups that are a first lens group having negative refractive power, a second lens group having positive refractive power, a third lens group having positive refractive power, fourth lens group having negative refractive power, a fifth lens group having positive refractive power, and a sixth lens group having positive refractive power that are arranged in this order from an enlargement conjugate side that is a screen side to a reduction conjugate side that is a display image side, with the second lens group, the third lens group, and the fifth lens group being moved at the time of magnification changing (Japanese Patent Application Laid-Open No. 2001-108900).

Also, an optical-correction-type zoom lens is known which is composed of two groups that are a first lens group having negative refractive power and a second lens group having positive refractive power that are arranged in this order from an object side (enlargement conjugate side) to an image side (reduction conjugate side), with magnification changing being performed by moving only the second lens group (U.S. Pat. No. 5,745,303).

Generally, in a liquid crystal projector that uses a liquid crystal panel as an image display element, it is important that a bright projection optical system is used and no shading exists. For instance, when the projection optical system is not image-side telecentric, brightness unevenness occurs and image quality is adversely affected. In addition, in recent years, there has been a demand for miniaturization of a projection lens resulting from miniaturization of the whole of a projector apparatus.

A multi-group optical system where a projection optical system is composed of multiple lens groups and the multiple lens groups are moved at the time of magnification changing is advantageous in terms of aberration compensation, but there is generally a problem in that the construction of the projection optical system becomes complicated and an increase in size is inevitable.

Also, the zoom lens proposed in U.S. Pat. No. 5,745,303 B as a simple lens construction is a zoom lens for a compact camera. Therefore, the reduction-side telecentricity of the zoom lens is not sufficient for a liquid crystal projector. In addition, the F-value of the zoom lens is around 10, so it is not necessarily possible to provide brightness sufficient for the projector.

SUMMARY OF THE INVENTION

The present invention has been made in view of the above-mentioned circumstances and an aspect of the invention is a zoom lens including three lens groups in which magnification change is performed by moving only one lens group among the three lens groups, focus adjustments of the zoom lens is performed by moving one of a first lens group and a second lens group counted from an enlargement conjugate side among the three lens groups, and the zoom lens is approximately telecentric on reduction conjugate side of the zoom lens.

Further, another aspect of the invention is an image projection apparatus including an image display element and a zoom lens for projecting light from the image display element, in which the zoom lens comprises three lens groups, magnification change is performed by moving only one lens group among the three lens groups, focus adjustments of the zoom lens is performed by moving one of a first Lens group and a second lens group counted from an enlargement conjugate side among the three lens groups, and the zoom lens is approximately telecentric on reduction conjugate side of the zoom lens.

Further, another aspect of the invention is a zoom lens including: a first lens group having negative refractive power; a second lens group having positive refractive power; and a third lens group having positive refractive power, in which the first lens group, the second lens group, and the third lens group are located in this order from an enlargement conjugate side, and in which magnification changing is performed by moving only the second lens group and focus adjustment is performed by moving only the first lens group.

Further, another aspect of the invention is an image projection apparatus including: an image display element; and a zoom lens for projecting light from the image display element, in which zoom lens comprises a first lens group having negative refractive power, a second lens group having positive refractive power, and a third lens group having positive refractive power, which are located in this order from an enlargement conjugate side, and in which magnification changing is performed by moving only the second lens group and focus adjustment is performed by moving only the first lens group.

Further, another aspect of the invention is a zoom lens including: a first lens group having negative refractive power; a second lens group having positive refractive power; a third lens group having positive refractive power; and a fourth lens group having positive refractive power, in which the first lens group, the second lens group, the third lens group, and the fourth lens group are located in this order from an enlargement conjugate side, and in which magnification changing is performed by moving only the third lens group and focus adjustment is performed by moving only the second lens group.

Further, another aspect of the present invention is an image projection apparatus including: an image display element; and a zoom lens for projecting light from the image display element, in which zoom lens comprises a first lens group having negative refractive power, a second lens group having positive refractive power, a third lens group having positive refractive power, and a fourth lens group having positive refractive power, which are located in this order from an enlargement conjugate side, and in which magnification changing is performed by moving only the third lens group and focus adjustment is performed by moving only the second lens group.

Further, another aspect of the invention is an image projection apparatus including: an image display element; and a zoom lens that projects light from the image display element, in which: the image display element is disposed on a reduction conjugate side of the zoom lens; the zoom lens includes a plurality of lens groups; a pupil on the reduction conjugate side of the zoom lens is located at approximately infinity; magnification changing is performed by moving only one lens group for magnification changing among the plurality of lens groups on an optical axis; and when an imaging magnification at a magnification changing position at a wide angle end of the lens group for magnification changing is "$\beta_{VW}$", a focal distance of the lens group for magnification changing is "$f_V$", and a lateral magnification, a magnification changing ratio, an F-value in an intermediate region at a time of magnification changing, and a minimum diameter of a circle of confusion of a last lens group are respectively "$\beta_r$", "$Z$", "$F_m$", and "$\epsilon$", following expressions are satisfied:

$$-1.2 < \beta_{VW} < -0.8$$

$$2 \cdot F_m \cdot \epsilon - |-f_V(1-\sqrt{Z})^2| \cdot \beta_r^2 / \sqrt{Z} > 0$$

Further, another aspect of the invention is a zoom lens including: three or more lens groups, in which: magnification changing is performed by moving only one lens group for magnification changing among the three or more lens groups in an optical axis direction of the zoom lens; and when an imaging magnification at a magnification changing position at a wide angle end of the lens group for magnification changing is "$\beta_{VW}$", a focal distance of the lens group for magnification changing is "$f_V$", and a lateral magnification, a magnification changing ratio, an F-value in an intermediate region at a time of the magnification changing, and a minimum diameter of a circle of confusion of a last lens group are respectively "$\beta_r$", "$Z$", "$F_m$", and "$\epsilon$", following expressions are satisfied:

$$-1.2 < \beta_{VW} < -0.8$$

$$2 \cdot F_m \cdot \epsilon - |-f_V(1-\sqrt{Z})^2| \cdot \beta_r^2 / \sqrt{Z} > 0$$

Further, another aspect of the invention is an image projection apparatus including: an image display element; and a zoom lens that projects light from the image display element, in which: the image display element is disposed on a reduction conjugate side of the zoom lens; the zoom lens includes three or more lens groups; magnification changing is performed by moving only one lens group for magnification changing among the three or more lens groups; and when an imaging magnification at a magnification changing position at a wide angle end of the lens group for magnification changing is "$\beta_{VW}$", a focal distance of the lens group for magnification changing is "$f_V$", and a lateral magnification, a magnification changing ratio, an F-value in an intermediate region at a time of magnification changing, and a minimum diameter of a circle of confusion of a last lens group are respectively "$\beta_r$", "$Z$", "$F_m$", and "$\epsilon$", following expressions are satisfied:

$$-1.2 < \beta_{VW} < -0.8$$

$$2 \cdot F_m \cdot \epsilon - |-f_V(1-\sqrt{Z})^2| \cdot \beta_r^2 / \sqrt{Z} > 0$$

DESCRIPTION OF THE PREFERRED EMBODIMENTS

The zoom lens and the image projection apparatus according to the present invention will now be described below.

The zoom lens according to the present invention is a zoom lens having multiple lens groups where a pupil position on a reduction conjugate side is located at approximately infinity and magnification changing is performed by moving only one lens group for magnification changing, out of the multiple lens groups, on an optical axis. Note that the description in which a pupil position on a reduction conjugate side is located an approximately infinity, means that the zoom lens is approximately telecentric on reduction conjugate side thereof.

Also, the zoom lens according to the present invention is composed of three or more lens groups and magnification changing is performed by moving only one lens group for magnification changing, out of the three or more lens groups, on the optical axis.

Here, the pupil position on the reduction conjugate side is located at approximately infinity. That is, the pupil position is substantially telecentric on a reduction side.

Also, focus adjustment is performed by moving a lens group, which is the first lens group or the second lens group when counted in a direction from the enlargement conjugate side to the reduction conjugate side, on the optical axis. In particular, the first lens group has negative refractive power.

As to magnification changing, the first lens group (lens group on the most enlargement conjugate side) and the last lens group (lens group on the most reduction conjugate side) of the zoom lens according to the embodiment are fixed with respect to a conjugate surface on the reduction side at the time of the magnification changing. The last lens group which is on the most reduction conjugate side, is composed of one positive lens (as a matter of course, when positive refractive power is possessed, the last lens group may be composed of two or more lenses). Also, the lens group for magnification changing is composed of two or more positive lenses and one or more negative lenses.

In the zoom lens according to the present invention, one or more surfaces that each have an aspherical surface shape are disposed and each lens having such a surface in the aspherical surface shape is a plastic lens. Also, the zoom lens according to the present invention has one or more lenses that are each made of glass whose Abbe number is 80 or more.

Also, the zoom lens according to the present invention has a first lens group having negative refractive power, a second lens group having positive refractive power, and a third lens group having positive refractive power in this order from the enlargement conjugate side to the reduction conjugate side and performs magnification changing by moving only the second lens group on the optical axis. Here, the second lens group is positioned on an enlargement conjugate side at a magnification changing position at a tele photo end with respect to a magnification changing position at a wide angle end.

Here, when the imaging magnification at the magnification changing position at the wide angle end of the second lens group is referred to as "$\beta_{VW}$", the following expression is satisfied:

$-1.2 < \beta_{VW} < -0.8$

In addition, when the focal distance of the second lens group is referred to as "$f_V$" and the lateral magnification, the magnification changing ratio, the F-value in an intermediate region at the time of magnification changing, and the minimum diameter of a circle of confusion of the third lens group are respectively "$\beta_r$", "Z", "$F_m$", and "$\epsilon$", following expressions are satisfied:

$2 \cdot F_m \cdot \epsilon - |-f_V (1-\sqrt{Z})^2| \cdot \beta_r^2 / \sqrt{Z} > 0$ In the zoom lens having the three-group construction described above, focus adjustment is performed by moving the first lens group in an optical axis direction.

In addition, the zoom lens according to the present invention has a first lens group having negative refractive power, a second lens group having positive refractive power, a third lens group having positive refractive power, and a fourth lens group having positive refractive power in this order from the enlargement conjugate side to the reduction conjugate side and performs magnification changing by moving only the third lens group in the optical axis direction. Here, the third lens group is positioned on the enlargement conjugate side at the magnification changing position at the tele photo end with respect to the magnification changing position at the wide angle end.

Here, when the imaging magnification at the magnification changing position at the wide angle end of the third lens group is referred to as "$\beta_{VW}$", the following expression is satisfied:

$-1.2 < \beta_{VW} < -0.8$

In addition, when the focal distance of the third lens group is referred to as "$f_V$" and the lateral magnification, the magnification changing ratio, the F-value in an intermediate region at the time of magnification changing, and the minimum diameter of a circle of confusion of the fourth lens group are respectively "$\beta_r$", "Z", "$F_m$", and "$\epsilon$", following expressions are satisfied:

$2 \cdot F_m \cdot \epsilon - |-f_V (1-\sqrt{Z})^2| \cdot \beta_r^2 / \sqrt{Z} > 0$ In the zoom lens having the four-group construction described above, focus adjustment is performed by moving the second lens group on the optical axis.

The zoom lens according to the present invention has an aperture diaphragm and when the synthesized focal distance of the lens system from the aperture diaphragm to the reduction conjugate side is referred to as "$f_r$" and the distance from the diaphragm to the principal point position on the enlargement conjugate side of the lens system on the reduction conjugate side is referred to as "L", the following expression is satisfied:

$0.45 < L/f_r < 1.1$

In addition, when the paraxial back focuses at the magnification changing positions at the wide angle end and the tele photo end are respectively referred to as "$BF_W$" and "$BF_T$", the F-value at the tele photo end is referred to as "$F_T$", and the minimum diameter of a circle of confusion is referred to as "$\epsilon$", the following expression is satisfied:

$2 \cdot F_T \cdot \epsilon - |BF_W - BF_T| > 0$

Also, on the enlargement conjugate side and the reduction conjugate side with the aperture diaphragm described above in-between, one or more surfaces that each have an aspherical surface shape is possessed.

Also, a negative lens LN including a surface having an aspherical surface shape and a positive lens LP including a surface having an aspherical surface shape are respectively provided on the enlargement conjugate side and the reduction conjugate side with the aperture diaphragm in-between. Further, the surface in the aspherical surface shape of the negative lens LN has a concave shape whose concave degree is reduced in a direction from a lens center to a lens peripheral portion and the surface in the aspherical surface shape of the positive lens LP has a convex shape whose convex degree is reduced in a direction from a lens center to a lens peripheral portion. Still further, the negative lens LN and the positive lens LP are each made of plastic.

Also, the zoom lens according to the present invention is a zoom lens having multiple lens groups where a pupil position on the reduction conjugate side is located at approximately infinity, magnification changing is performed by moving only one lens group for magnification changing, out of the multiple lens groups, on the optical axis, and when the imaging magnification at the magnification changing position at the wide angle end of the lens group for magnification changing is referred to as "$\beta_{VW}$", the focal distance of the lens group for magnification changing is referred to as "$f_V$", and the lateral magnification, the magnification changing ratio, the F-value in an intermediate region at the time of magnification changing, and the minimum diameter of a circle of confusion of the last lens group are respectively "$\beta_r$", "Z", "$F_m$", and "$\epsilon$", following expressions are satisfied:

$-1.2 < \beta_{VW} < -0.8$ $2 \cdot F_m \cdot \epsilon - |-f_V (1-\sqrt{Z})^2| \cdot \beta_r^2 / \sqrt{Z} > 0$ Also, the zoom lens according to the present invention is composed of three or more lens groups, where magnification changing is performed by moving only one lens group for magnification changing, out of the multiple lens groups, on the optical axis and when the imaging magnification at the magnification changing position at the wide angle end of the lens group for magnification changing is referred to as "$\beta_{VW}$", the focal distance of the lens group for magnification changing is referred to as "$f_V$", and the lateral magnification, the magnification changing ratio, the F-value in an intermediate region at the time of magnification changing, and the minimum diameter of a circle of confusion of the last lens group are respectively "$\beta_r$", "Z", "$F_m$", and "$\epsilon$", following expressions are satisfied:

$$-1.2 < \beta_{VW} < -0.8$$

$$2 \cdot F_m \cdot \epsilon - |-f_V(1-\sqrt{Z})^2| \cdot \beta_r^2/\sqrt{Z} > 0$$

Also, the image projection apparatus according to the present invention includes an image display element (light modulation element such as a liquid crystal panel) and any one of the zoom lenses described above and throws an original image displayed by the image display element onto a projection target screen using the zoom lens. Here, the minimum diameter of a circle of confusion is set twice as large as the pixel pitch of the image display element.

Also, when the imaging magnification at the magnification changing position at the wide angle end of the lens group for magnification changing is referred to as "$\beta_{VW}$", the focal distance of the lens group for magnification changing is referred to as "$f_V$", the lateral magnification, the magnification changing ratio, and the F-value in an intermediate region at the time of magnification changing of the last lens group are respectively referred to as "$\beta_r$", "Z", "$F_m$", and the minimum diameter of a circle of confusion "$\epsilon$" of the zoom lens is set twice as large as the pixel pitch of the image display element, the following expressions are satisfied:

$$-1.2 < \beta_{VW} < -0.8$$

$$2 \cdot F_m \cdot \epsilon - |-f_V(1-\sqrt{Z})^2| \cdot \beta_r^2/\sqrt{Z} > 0$$

Hereinafter, embodiments of the zoom lens and the image projection apparatus having the same according to the present invention will be described in a concrete manner with reference to the drawings.

Figure 1:
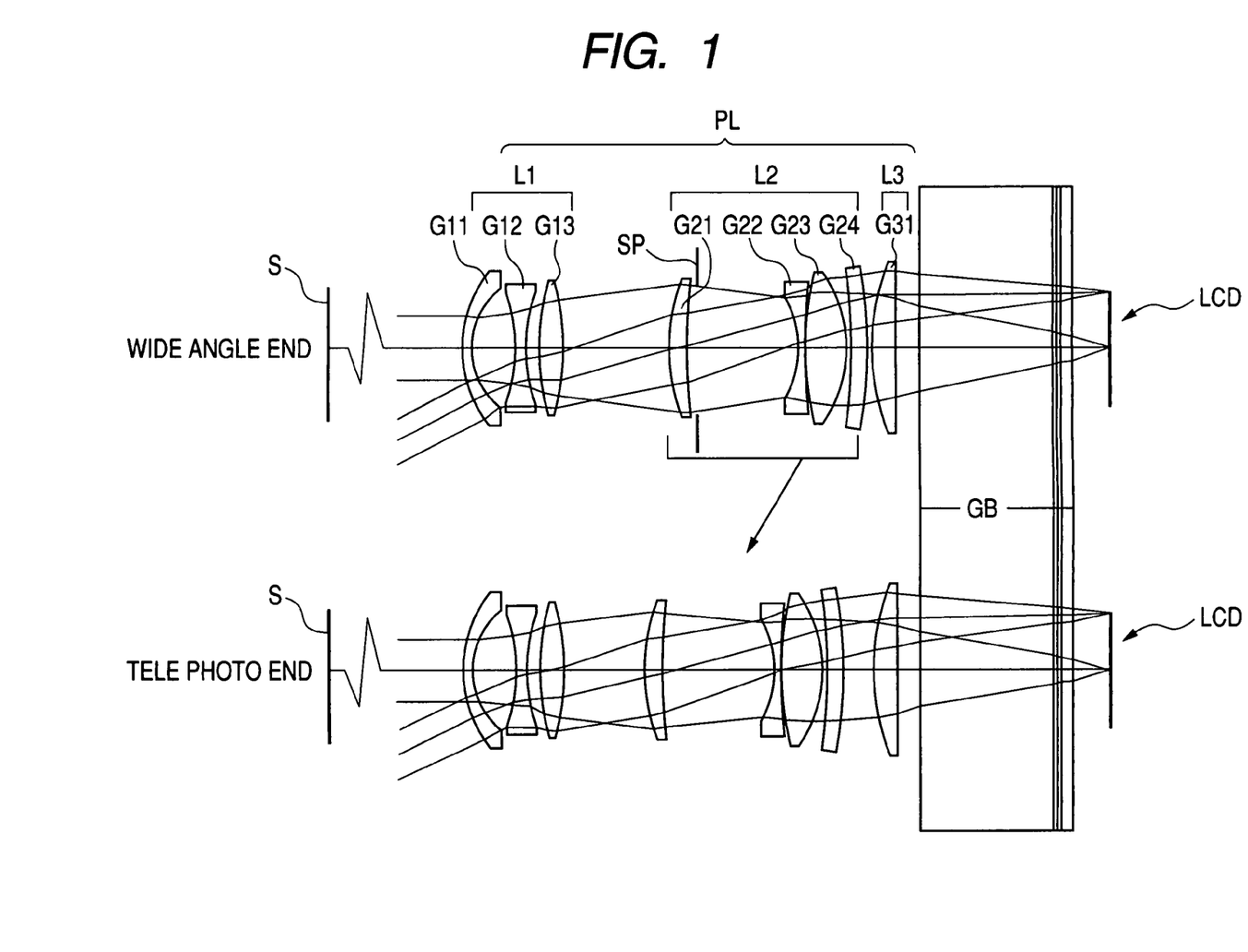
FIG. 1 is a lens cross-sectional view showing both cases of a wide angle end and a tele photo end according to a first embodiment of the present invention.

FIG. 1 is a schematic diagram of a main portion showing both cases of a wide angle end (short focal distance) and a tele photo end (long focal distance) of an image projection apparatus (liquid crystal video projector) that uses a zoom lens according to a first embodiment of the present invention.

Figure 2A:
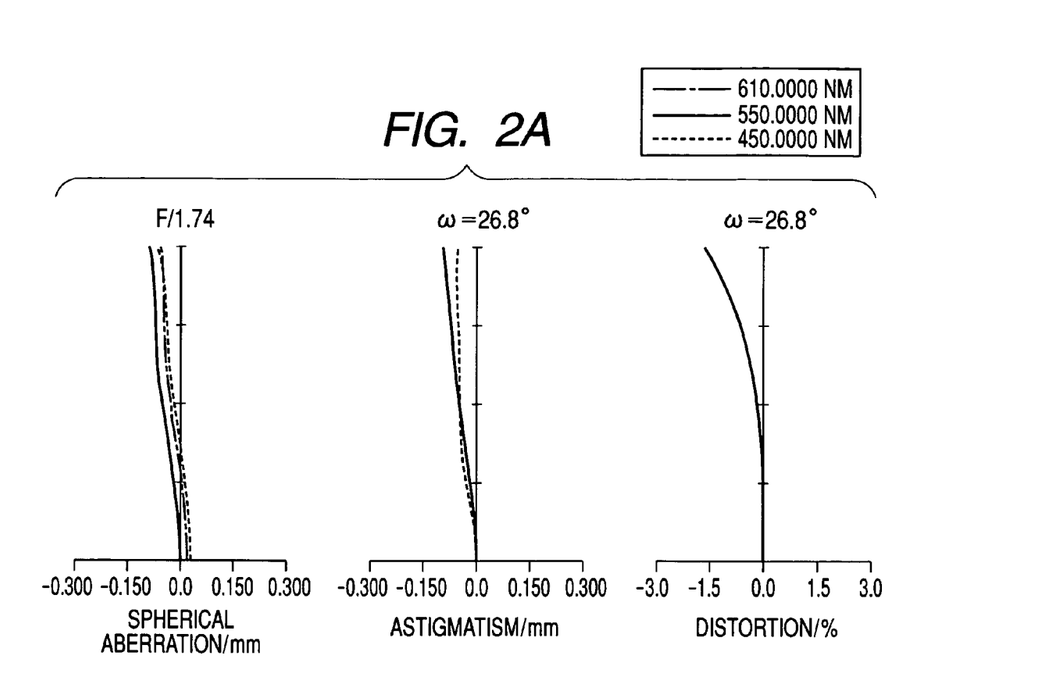
FIGS. 2A and 2B are respectively aberration diagrams at the wide angle end and the tele photo end where an object distance is set at 2.35 m and a zoom lens according to a first numerical embodiment is expressed in units of mm.
Figure 2B:
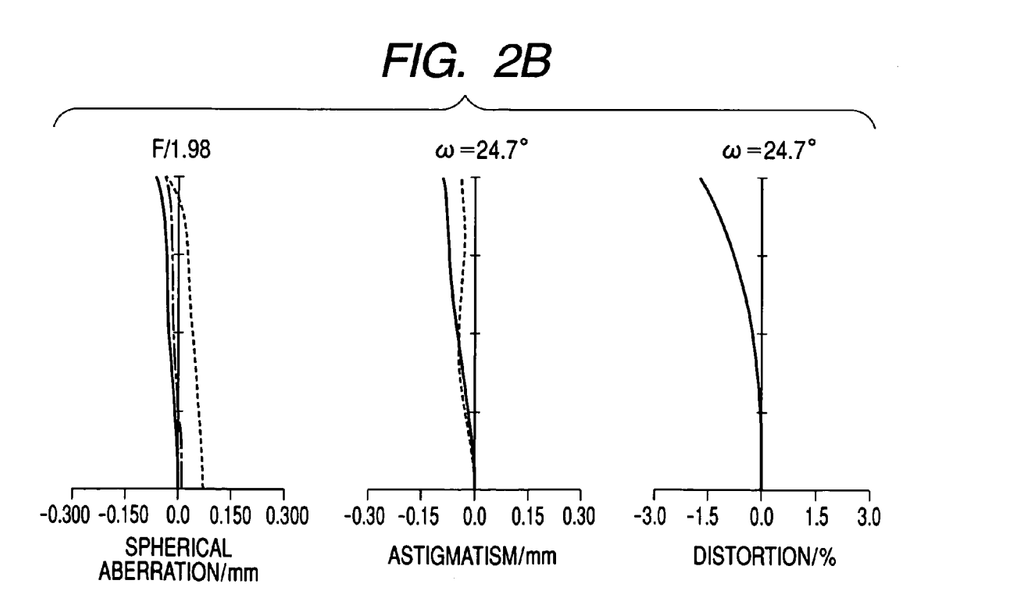

FIGS. 2A and 2B are respectively aberration diagrams at the wide angle end (short focal distance) and the tele photo end (long focal distance) where an object distance (distance from the first lens group) is set at 2.35 m and numerical values in a first numerical embodiment to be described later corresponding to the first embodiment of the present invention are expressed in units of mm.

Figure 3:
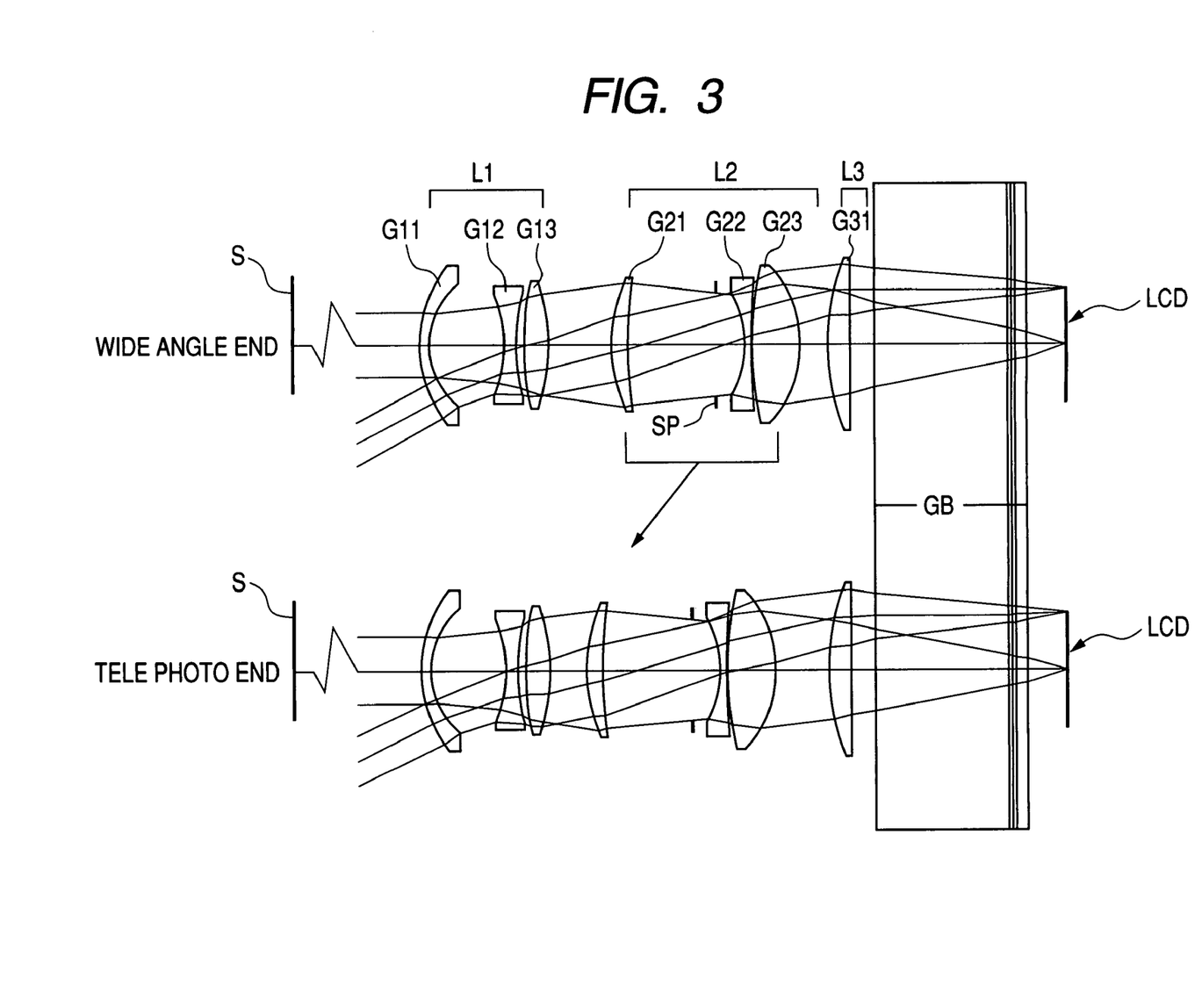
FIG. 3 is a lens cross-sectional view showing both cases of a wide angle end and a tele photo end according to a second embodiment of the present invention.

FIG. 3 is a schematic diagram of a main portion showing both cases of a wide angle end (short focal distance) and a tele photo end (long focal distance) of an image projection apparatus (liquid crystal video projector) that uses a zoom lens according to a second embodiment of the present invention.

Figure 4A:
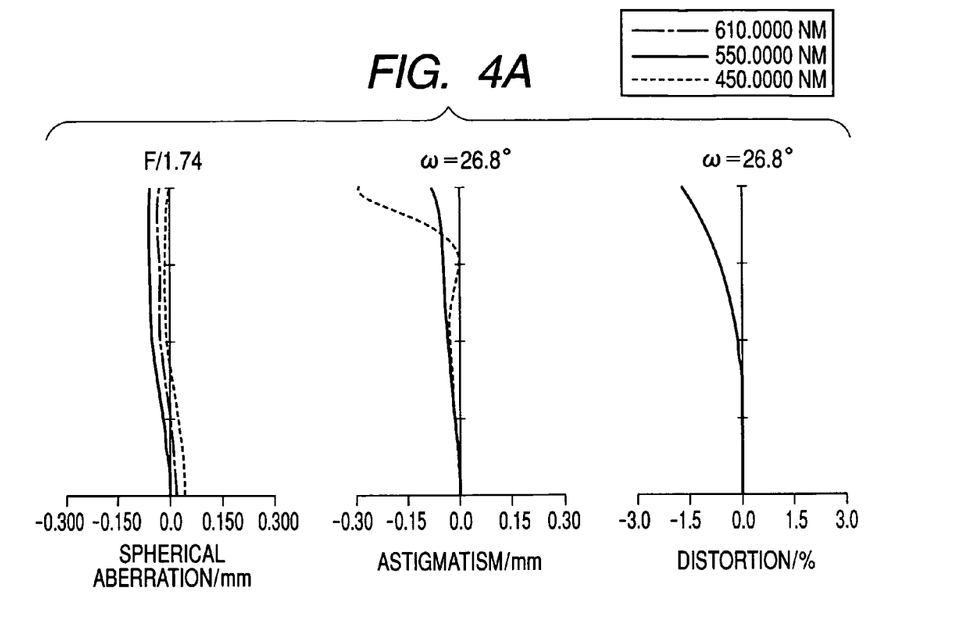
FIGS. 4A and 4B are respectively aberration diagrams at the wide angle end and the tele photo end where an object distance is set at 2.35 m and a zoom lens according to a second numerical embodiment is expressed in units of mm.
Figure 4B:
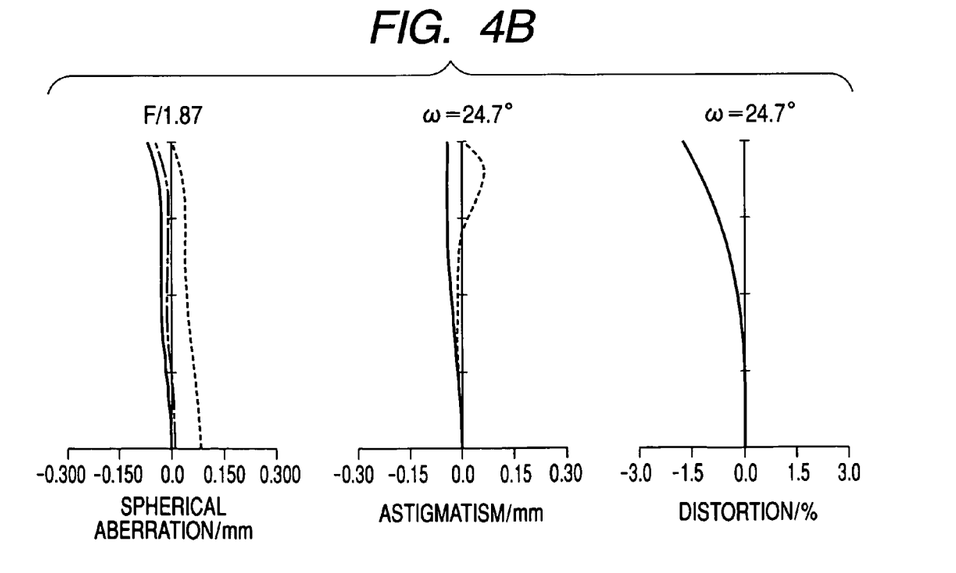

FIGS. 4A and 4B are respectively aberration diagrams at the wide angle end (short focal distance) and the tele photo end (long focal distance) where an object distance (distance from the first lens group) is set at 2.35 m and numerical values in a second numerical embodiment to be described later corresponding to the second embodiment of the present invention are expressed in units of mm.

Figure 5:
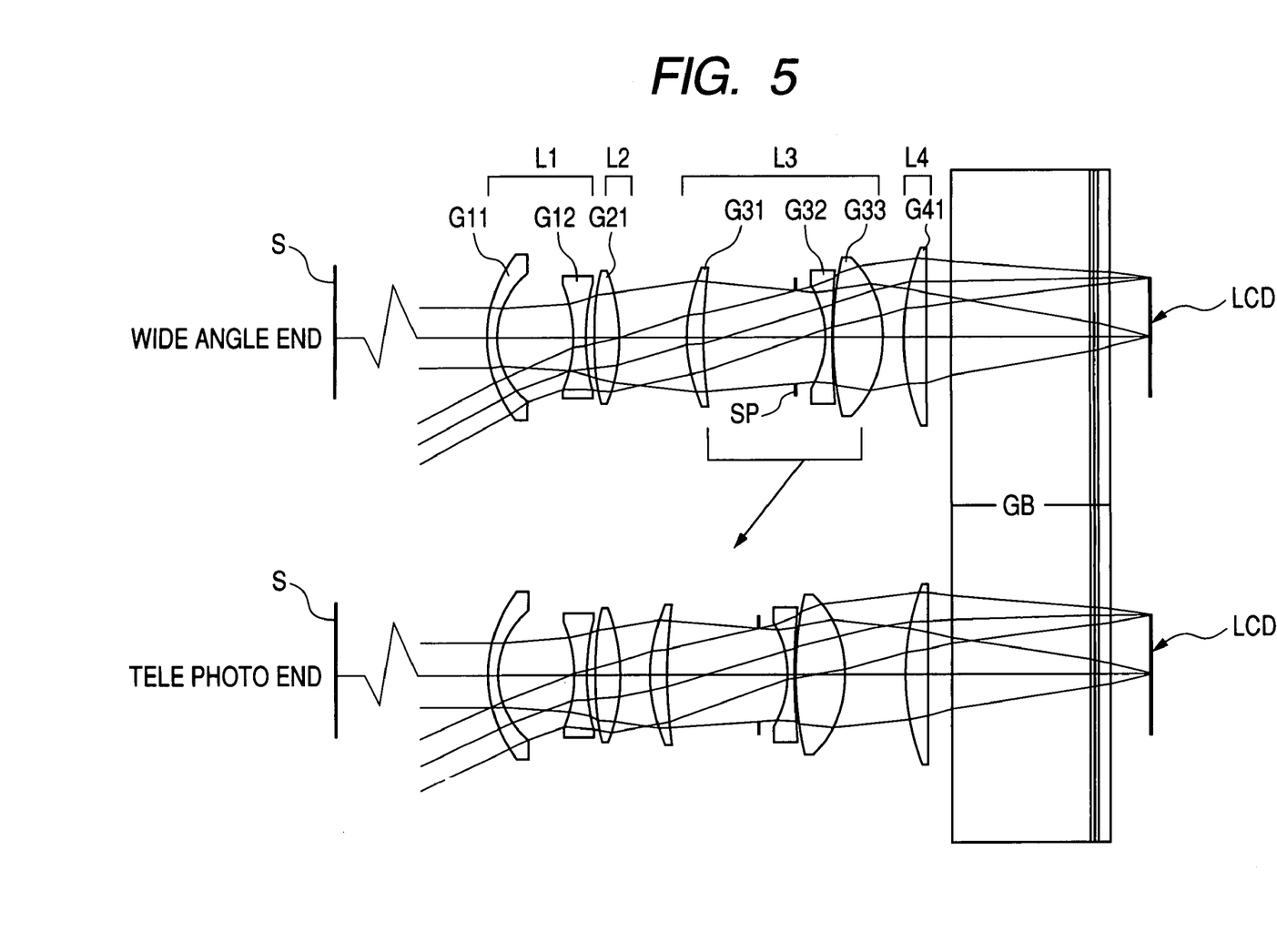
FIG. 5 is a lens cross-sectional view showing both cases of a wide angle end and a tele photo end according to a third embodiment of the present invention.

FIG. 5 is a schematic diagram of a main portion showing both cases of a wide angle end (short focal distance) and a tele photo end (long focal distance) of an image projection apparatus (liquid crystal video projector) that uses a zoom lens according to a third embodiment of the present invention.

Figure 6A:
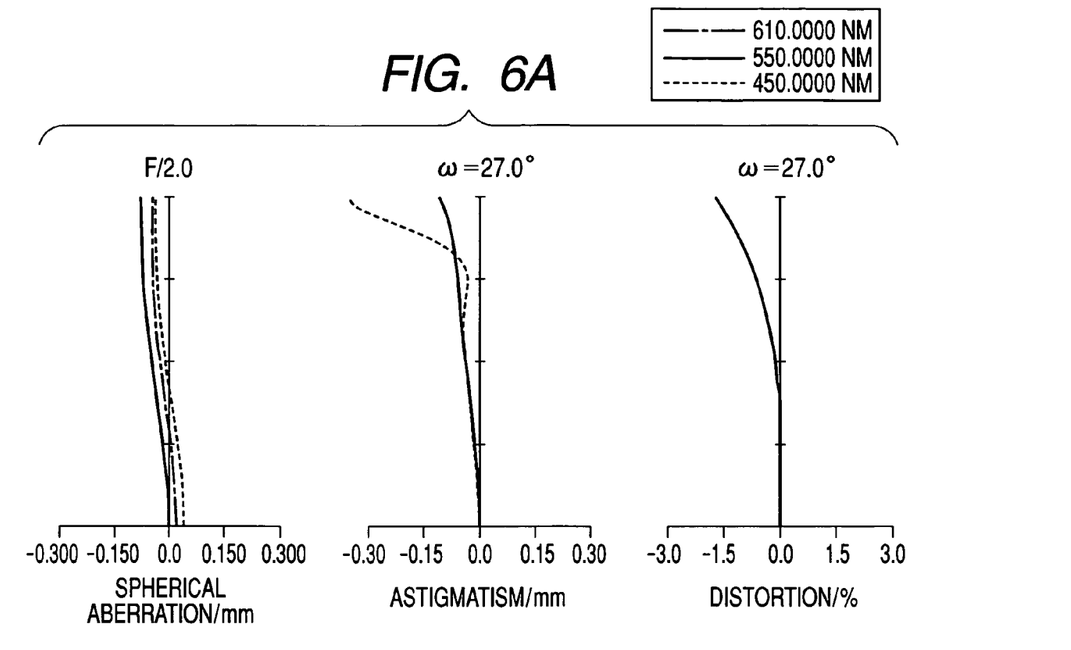
FIGS. 6A and 6B are respectively aberration diagrams at the wide angle end and the tele photo end where an object distance is set at 2.35 m and a zoom lens according to a third numerical embodiment is expressed in units of mm.
Figure 6B:
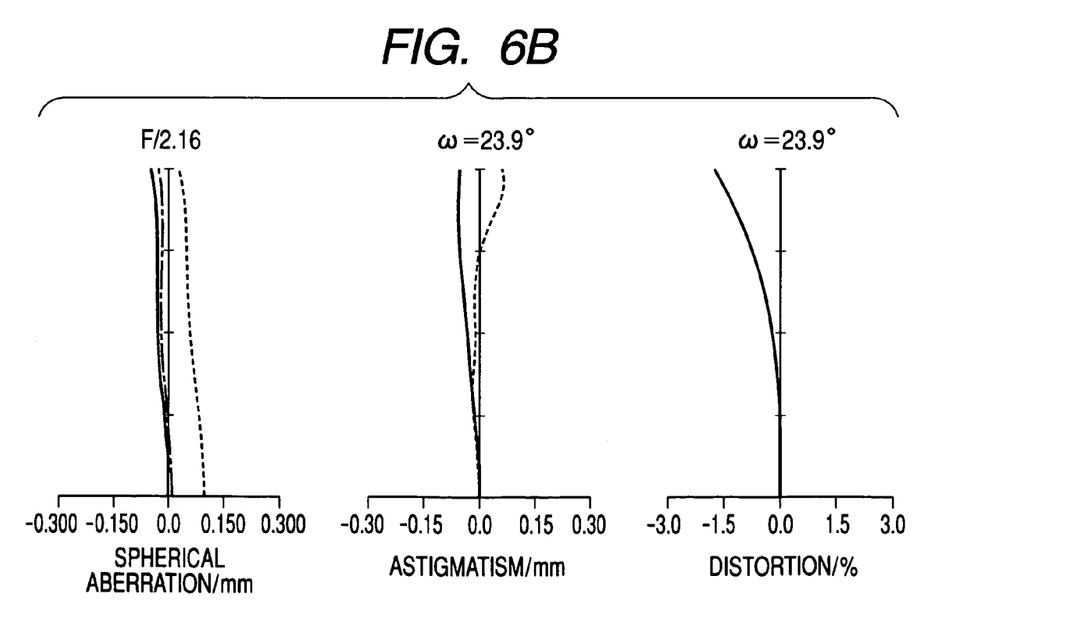

FIGS. 6A and 6B are respectively aberration diagrams at the wide angle end (short focal distance) and the tele photo end (long focal distance) where an object distance (distance from the first lens group) is set at 2.35 m and numerical values in a third numerical embodiment to be described later corresponding to the third embodiment of the present invention are expressed in units of mm.

Figure 7:
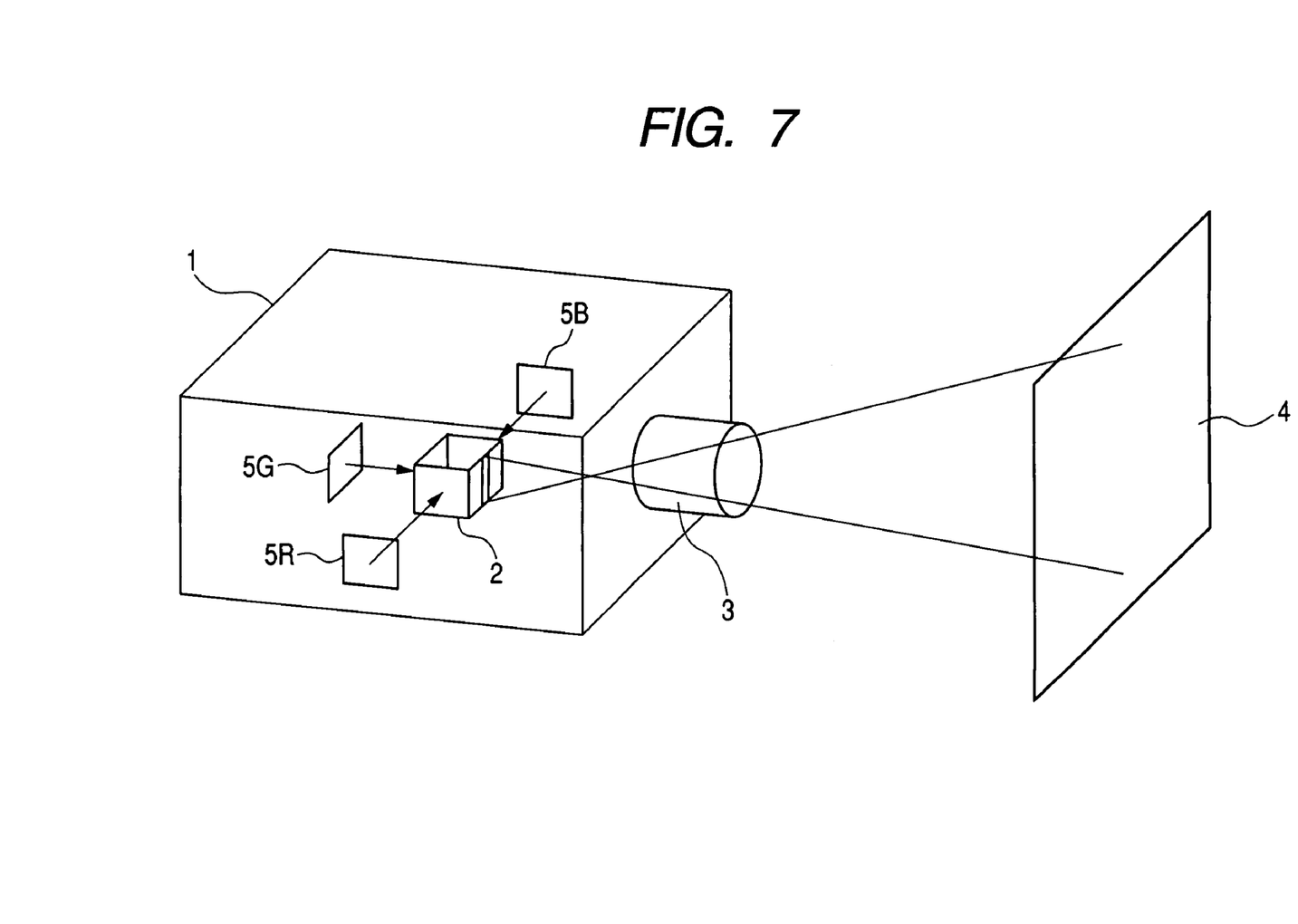
FIG. 7 is a schematic view of the main portion of an image projection apparatus according to the present invention.

FIG. 7 is a schematic diagram of a main portion of a color liquid crystal projector to which the zoom lens according to the present invention is applied.

In each of the image projection apparatuses according to the first to third embodiments shown in FIGS. 1, 3, and 5, an original image (throwing target image) displayed on a liquid crystal panel LCD or the like is magnified and thrown onto a screen surface S using the zoom lens (throwing lens, projection lens) PL.

In the drawings, reference symbol S denotes a screen surface (throwing surface) and reference symbol LCD denotes an original image (throwing target image) on a liquid crystal panel (liquid crystal display element) or the like. The screen surface S and the original image LCD are in a conjugate relationship and, generally, the screen surface S corresponds to a conjugate point having a long distance (enlargement conjugate side) and the original image LCD corresponds to a conjugate point having a short distance (reduction conjugate side).

Reference symbol GB denotes a glass block composed of, for instance, a color synthesis prism, a polarizing filter, and a color filter.

The zoom lens PL is fitted to the main body (not shown) of the liquid crystal video projector through a connection member (not shown). A liquid crystal display element LCD side following the glass block GB is contained in the projector main body.

Reference symbol Li denotes the ith lens group when counted in a direction from the enlargement conjugate side to the reduction conjugate side.

In the first and second embodiments respectively shown in FIGS. 1 and 3, reference symbol L1 denotes the first lens group having negative refractive power, reference symbol L2 denotes the second lens group having positive refractive power, and reference symbol L3 denotes the third lens group having positive refractive power.

In the third embodiment shown in FIG. 5, reference symbol L1 denotes the first lens group having negative refractive power, reference symbol L2 denotes the second lens group having positive refractive power, reference symbol L3 denotes the third lens group having positive refractive power, and reference symbol L4 denotes the fourth lens group having positive refractive power. Reference symbol SP denotes a diaphragm.

The zoom lens in each embodiment is a so-called optical-correction-type zoom lens where one lens group Va is moved on the optical axis at the time of magnification changing from the wide angle end to a zoom position at the tele photo end.

The lens group Va is the second lens group L2 in the first and second embodiments shown in FIGS. 1 and 3 and is the third lens group L3 in the third embodiment shown in FIG. 5 and the magnification changing from the wide angle end to the tele photo end is performed by moving the lens group Va from the reduction conjugate side to the enlargement conjugate side as indicated by arrows.

With respect to the magnification changing position at the wide angle end, at the magnification changing position at the tele photo end, the lens group Va is positioned on an enlargement conjugate side.

The last lens group optically acts as a field lens, by which the pupil position on the reduction conjugate side is located at approximately infinity (when the pupil position is located at approximately infinity, it is not necessarily required that the pupil position is located at infinity and it is sufficient that a range expressed by Conditional Expression (2) given below is satisfied). Lens surfaces in the entire system include one or more surfaces that each have an aspherical surface shape. Lenses that each have such a surface in the aspherical surface shape include lenses produced through molding of plastic.

In each embodiment, a retrofocus-type construction is used in which the lens group on the most enlargement conjugate side has negative refractive power and the lens group on the most reduction conjugate side has positive refractive power, thereby securing desired back focus and makes it easy to realize a wide angle. It is preferable that a three- or more-group construction be used and it is more preferable that a construction having a lens group arrangement of negative, positive, and positive refractive power be used because it becomes possible to secure telecentric performance and to favorably compensate for various aberrations in the simplest manner.

At the time of magnification changing, the lens group on the most enlargement conjugate side and the lens group on the most reduction conjugate side are fixed with respect to the conjugate surface on the reduction side, by which a zoom lens, whose lens overall length at the time of magnification changing is constant, is obtained and centroid movement of lens groups, whose diameters are large, is eliminated, so it becomes possible to realize stabilized lens holding at the time of mounting to a liquid crystal throwing apparatus.

It should be noted here that the lens group on the most reduction conjugate side is required to have positive refractive power in order to realize telecentric performance, however the lens group is composed of only one positive lens, thereby achieving further weight reduction.

In addition, in some cases, it is possible to use the lens group on the most reduction conjugate side as a back focus adjustment group, so the lens group uses a simple construction where only one positive lens is used.

The lens group Va that moves at the time of magnification changing is composed of at least two positive lenses and at least one negative lens. The lens group Va is a lens group that is solely moved for magnification changing and a construction is selected in which even when magnification is changed in the vicinity of equal-magnification as a result of movement of the lens group Va, there will not occur any large aberration variations. Therefore, the lens group Va is constructed using at least two positive lenses for sharing of positive refractive power and reduction of aberration occurrence and using one negative lens for sufficient compensation for aberrations that occurred at the positive lenses.

Also, in order to favorably compensate for distortion, coma aberrations, and the like that are generally ascribable to an asymmetric power arrangement and are unique to a retrofocus-type lens, one or more lenses each having an aspherical surface shape are disposed on each of the enlargement conjugate side and the reduction conjugate side with the aperture diaphragm SP in-between. Preferably, as to the lenses each having the aspherical surface shape, the lens in the aspherical surface shape on the enlargement conjugate side is a negative lens and the lens in the aspherical surface shape on the reduction conjugate side is a positive lens. In addition, as to the surface shape, the negative lens in the aspherical surface shape on the enlargement conjugate side with the aperture diaphragm SP in-between has the aspherical surface shape on its concave surface, with a concave degree of the aspherical surface shape being reduced in a direction from the lens center to the peripheral portion.

When the positive lens in the aspherical surface shape on the reduction conjugate side has the aspherical surface shape on its convex surface and a convex degree of the aspherical surface shape is reduced in a direction from the lens center to the peripheral portion, it becomes possible to further reduce various aberrations that occur at each refractive surface. As to the arrangement of the aspherical surfaces, in terms of aberration compensation, it is effective that at least one aspherical surface is provided at a position, such as in the first lens group, that is as far as possible from the diaphragm SP.

In addition, the lens in the aspherical surface shape is produced through molding of plastic, thereby realizing further cost reduction and weight reduction of the optical system in addition to the weight reduction through the reduction of the number of construction elements.

Also, from the viewpoint of chromatic aberration compensation, an optical system with less color drift in a visible region is realized using at least one lens made of glass whose Abbe number is 80 or more.

Focusing is performed by moving the first lens group L1 or the second lens group counted from the enlargement conjugate side. When the imaging magnification at the magnification changing position at the wide angle end of the magnification changing lens group (the second lens group L2 in the first and second embodiments and the third lens group L3 in the third embodiment) is referred to as "$\beta_{VW}$", the following expression is satisfied:

$$-1.2 < \beta_{VW} < -0.8 \quad (1)$$

When a synthesized focal distance of the lens system from the aperture diaphragm SP to the reduction conjugate side is referred to as "$f_r$" and a distance from the diaphragm SP to the principal point position on the enlargement conjugate side of the lens system on the reduction conjugate side is referred to as "L", the following expression is satisfied:

$$0.45 < L/f_r < 1.1 \quad (2)$$

When the focal distance of the lens group Va is referred to as "$f_V$" and the lateral magnification, the magnification changing ratio, the F-value in an intermediate region at the time of magnification changing, and the minimum diameter of a circle of confusion of the third lens group in the first and second embodiments and the fourth lens group L4 in the third embodiment are respectively referred to as "$\beta_r$", "Z", "$F_m$", and "$\epsilon$", the following expression is satisfied:

$$2 \cdot F_m \cdot \epsilon - |-f_V \cdot (1-\sqrt{Z})^2| \cdot \beta_r^2 / \sqrt{Z} > 0 \quad (3)$$

When the paraxial back focuses at the magnification changing positions at the wide angle end and the tele photo end are respectively referred to as "$BF_W$" and "$BF_T$", the F-value at the tele photo end is referred to as "$F_T$", and the minimum diameter of a circle of confusion is referred to as "$\epsilon$", the following expression is satisfied:

$$2 \cdot F_T \cdot \epsilon - |BF_W - BF_T| > 0 \quad (4)$$

Also, the following expression is satisfied:

$$1.5 < F_m < 2.2 \quad (5)$$

Next, the technical meaning of each conditional expression described above will be described.

When the lower limit of Conditional Expression (1) is exceeded, at the time of magnification changing from the wide angle end to the tele photo end, an unfavorable situation occurs in which as to the focal surface, movement in the backward direction with respect to the lens groups is too large. Also, when the upper limit is conversely exceeded, an unfavorable situation occurs in which movement in the frontward direction with respect to the lens groups is too large.

When the zoom lens according to the present invention is applied to a throwing system for a liquid crystal projector, it is preferable that the pupil position be arranged at a position that is as far as possible from the reduction conjugate side. The same applies to an optical system that uses an image pickup element (CCD) or the like. More specifically, it is preferable that Conditional Expression (2) be satisfied.

With a construction outside the range expressed by Conditional Expression (2), it is impossible to obtain favorable telecentric performance. When a zoom lens that does not have favorable telecentric performance is applied to a throwing system for a liquid crystal projector or the like, an unfavorable situation occurs in which illuminance lowering, an in-screen color unevenness, or the like occurs on the periphery of the screen. Also, when focus adjustment is performed by moving a lens group on the enlargement conjugate side with respect to a magnification changing portion, it becomes possible to ensure a constant focal position for the entire magnification changing region even when an object-image distance is changed.

As to the magnification changing lens group, when it is possible to construct the lens system with one component, it becomes possible to simplify a lens-barrel structure and the like, which enables weight reduction through a reduction of the number of construction elements or the like.

The zoom lens in each embodiment is an optical-correction-type zoom lens, so from the viewpoint of a focus movement amount at the time of magnification changing, when the focal distance of the magnification changing lens group is referred to as "$f_V$" and the lateral magnification, the magnification changing ratio, the F-value in an intermediate region, and the minimum diameter of a circle of confusion of the last (third) lens group are respectively referred to as "$\beta_r$", "$Z$", "$F_m$", and "$\epsilon$" and when consideration is given to a condition where the focal position coincides at the wide angle end and the tele photo end, it is possible to obtain the maximum focus displacement amount $\Delta_m$ of displacements in the intermediate region at the time of magnification changing by newly multiplying the expression in the two-group zoom lens described in Japanese Patent Application Laid-Open No. H07-333500 by the squares of the lateral magnifications of the three groups in the case of this embodiment, so it is possible to paraxially calculate the maximum focus displacement amount $\Delta_m$ in the manner given below.

$$\Delta_m = |-f_{V'}(1-\sqrt{Z})^2| \cdot \beta_r^2/\sqrt{Z}$$

Also, the depth of focus $\delta$ is expressed by the product of the F-value of the lens and the permissible diameter of a circle of confusion $\epsilon$ and therefore is defined as follows.

$$\delta = F_m \cdot \epsilon$$

When $\Delta_m$ is allowed fully as to the depth on both sides of the magnification changing range and "$2\delta > \Delta_m$", even when a focus displacement occurs, it is contained within the depth of focus, so it can be seen that it is sufficient that Conditional Expression (3) be satisfied.

A situation where Conditional Expression (3) takes a negative value is not preferable because, in this case, the focus displacement amount at the time of magnification changing becomes greater than the depth of focus of the optical system.

It should be noted here that in each embodiment, it is preferable that the minimum diameter of a circle of confusion $\epsilon$ be around twice as large as the pixel pitch in an image pickup device using a CCD, a projector using a liquid crystal panel, or the like. A situation where the minimum diameter of a circle of confusion $\epsilon$ is increased from that level is not preferable because, in this case, a blurring diameter is increased.

Also, when the paraxial back focus is displaced at the zoom positions at the wide angle end and the tele photo end, it is preferable that Conditional Expression (4) be satisfied because in this case, it also becomes possible to suppress a defocusing amount so as to fall within the depth.

Conditional Expression (5) is an expression for achieving an increase in luminance. Also, Conditional Expression (5) is an expression for suppression within the depth of focus during entire magnification changing as the optical-correction-type zoom lens.

A situation where the upper limit value or the lower limit value of Conditional Expression (5) is exceeded is not preferable because brightness becomes insufficient or the depth of focus is exceeded, for instance, and therefore the quality of a photographed image or picked-up image is lowered.

It should be noted here that in each embodiment, it is more preferable that numerical value ranges of Conditional Expressions (1), (2), and (5) be set as follows.

$$-1.0 < \beta_{VW} < -0.8 \tag{1a}$$

$$0.5 < L/f_r < 1.0 \tag{2a}$$

$$1.6 < F_m < 2.1 \tag{5a}$$

Also, it is still more preferable that the lower limit value of Conditional Expression (3) be set at 0.04. In addition, the lower limit value of Conditional Expression (4) may be set at 0.03.

Further, the numerical value range of Conditional Expression (2) may be narrowed as follows.

$$0.5 < L/f_r < 0.65 \tag{2a}$$

Next, features of the lens construction in each embodiment will be described. As is apparent from the following description of the embodiment, the lens group in the embodiment is not required to have multiple lenses and it is sufficient that the lens group have at least one lens.

First Embodiment

The first embodiment shown in FIG. 1 has a three-group construction composed of the lens group L1 having negative refractive power, the lens group L2 having positive refractive power, and the lens group L3 having positive refractive power that are arranged in this order from the enlargement conjugate side to the reduction conjugate side. When an object-image distance is changed, focus adjustment is performed by moving the first lens group L1.

At the time of magnification changing from the wide angle end to the tele photo end, the first lens group L1 and the third lens group L3 are fixed and have constant total lengths and only the second lens group L2 is independently moved toward the enlargement conjugate side. Also, in order to ensure illuminance on the screen S, a multilayer coat is applied to each lens surface.

The first lens group L1 has a three-lens construction including a negative lens G11, a negative lens G12, and a positive lens G13 from the enlargement conjugate side. By designing the first lens G11 disposed on the most enlargement conjugate side using a negative lens, an apparent pupil position is set on the enlargement conjugate side and the diameter of a front lens is reduced. Also, the first lens G11 is a lens which is made of a plastic material and whose both surfaces each have an aspherical surface shape, thereby making it possible to compensate for distortion and the like with efficiency.

Also, the second lens group L2 functions as a magnification changing lens group. In this embodiment, the second lens group L2 includes a positive lens G21, a diaphragm SP, a negative lens G22, a positive lens G23, and a positive lens G24 in this order from the enlargement conjugate side, and is a lens group whose number of construction lens elements is the largest among the construction lens groups. In particular, the positive lens G24 positioned on the most reduction conjugate side is a lens which was produced through molding of a plastic material and whose both surfaces each have an aspherical surface shape. With this construction, it becomes possible to mainly compensate for distortion, curvature of field, and the like with efficiency.

In this embodiment, temperature drift characteristics at the time of environmental variations are mutually canceled between the positive lens G24 made of a plastic material and the negative lens G11 made of a plastic material in the first lens group L1.

The second lens group L2 is set so that the magnification $\beta_{VW}$ in the total magnification changing region exists in the vicinity of approximately equal-magnification.

The third lens group L3 includes one positive lens G31. The positive lens G31 is used mainly for a refractive action where off-axis main light beam angle is set closer to parallel to the optical axis and for reduction in synthesized refractive power of the first lens group L1 and the second lens group L2. As a material of the positive lens G31, s-lal14 (manufactured by Kabushiki Kaisha Ohara) is used. Preferably, when refractive indexes with respect to d-, g-, F-, and c-lines are respectively referred to as "nd", "ng", "$n_F$", and "nc" and the following equations are satisfied, glass satisfying the following expression is selected.

$$\nu_d = (n_d - 1)/(n_F - n_c)$$

$$\theta_{gF} = (n_g - n_F)/(n_F - n_c)$$

$$\theta_{gF} - (0.6438 - 0.001682 \nu_d) > 0$$

In this case, correction of chromatic aberration of magnification in a wide band becomes easy.

According to this embodiment, it becomes possible to realize a zoom lens that has a large aperture (F-value=1.7) and high luminance but has less focus movements at the time of magnification changing.

Also, numerical values of Conditional Expressions (1) to (5) in this embodiment are given below.

Conditional Expressions $$\beta_{VW} = -0.94 \quad (1)$$

$$L/f_r = 0.87 \quad (2)$$

$$2F_m \cdot \epsilon \leftarrow |-f_V(1-\sqrt{Z})^2| \cdot \beta_r^2/\sqrt{Z} = 0.080 \quad (3)$$

$$2 \cdot F_T \epsilon \leftarrow |BF_W - BF_T| = 0.055 \quad (4)$$

$$F_m = 1.84 \quad (5)$$

Second Embodiment

The second embodiment in FIG. 3 has a three-group construction including the lens group L1 of negative refractive power, the lens group L2 of positive refractive power, and the lens group L3 of positive refractive power in this order from the enlargement conjugate side to the reduction conjugate side. When an object-image distance is changed, focus adjustment is performed by moving the first lens group L1.

At the time of magnification changing from the wide angle end to the tele photo end, the first lens group L1 and the third lens group L3 are fixed and have constant total lengths and only the second lens group L2 is independently moved toward the enlargement conjugate side. Also, in order to ensure illuminance on the screen S, a multilayer coat is applied to each lens surface.

The first lens group L1 has a three-lens construction including a negative lens G11, a negative lens G12, and a positive lens G13 from the enlargement conjugate side. By designing the first lens G11 disposed on the most enlargement conjugate side using a negative lens, an apparent pupil position is set on the enlargement conjugate side and the diameter of a front lens is reduced. Also, the first lens G11 is a lens which was produced using special low dispersion glass "s-FPL51" (manufactured by Kabushiki Kaisha Ohara) with an Abbe number of 80 or more and whose both surfaces each have an aspherical surface shape. With this construction, it becomes possible to compensate for distortion and the like with efficiency. In particular, the aspherical surface shape is provided for a concave surface on the reduction conjugate side and has a shape where the concave degree is reduced in a direction from the lens center to the lens peripheral portion. With this construction, it becomes possible to compensate for distortion, introversive coma aberration, and the like with efficiency.

The second lens group L2 functions as a magnification changing lens group. In this embodiment, the second lens group L2 includes a positive lens G21, a diaphragm SP, a negative lens G22, and a positive lens G23 in this order from the enlargement conjugate side, and is a lens group whose number of construction lens elements is the largest among the construction lens groups. In particular, the positive lens G23 positioned on the most reduction conjugate side is a lens which was produced through molding of a glass material and whose both surfaces each have an aspherical surface shape. With this construction, it becomes possible to mainly compensate for distortion, curvature of field, and the like with efficiency. In particular, the aspherical surface shape is provided for a convex surface on the reduction conjugate side and has a shape where the convex degree is reduced in a direction from the lens center to the lens peripheral portion. With this construction, it becomes possible to favorably compensate for distortion, curvature of field, and the like.

The second lens group L2 is set so that the magnification $\beta_{VW}$ in the total magnification changing region exists in the vicinity of approximately equal-magnification.

Other points are the same as those in the first embodiment, so the detailed description thereof will be omitted.

According to this embodiment, it becomes possible to realize a zoom lens that has a large aperture (F-value=1.7) and high luminance but has less focus movements at the time of magnification changing.

Also, numerical values of Conditional Expressions (1) to (5) in this embodiment are given below.

Conditional Expressions $$\beta_{VW} = -0.94 \quad (1)$$

$$L/f_r = 0.54 \quad (2)$$

$$2 \cdot F_m \cdot \epsilon \cdot |-f_V(1-\sqrt{Z})^2| \cdot \beta_r^2 / \sqrt{Z} = 0.076 \quad (3)$$

$$2 \cdot F_T \cdot \epsilon \cdot |BF_W - BF_T| = 0.052 \quad (4)$$

$$F_m = 1.80 \quad (5)$$

Third Embodiment

The third embodiment shown in FIG. 5 has a four-group construction including the lens group L1 of negative refractive power, the lens group L2 of positive refractive power, the lens group L3 of positive refractive power, and the lens group L4 of positive refractive power in this order from the enlargement conjugate side to the reduction conjugate side. When an object-image distance is changed, focus adjustment is performed by moving the second lens group L2.

At the time of magnification changing from the wide angle end to the tele photo end, the first lens group L1, the second lens group L2, and the fourth lens group L4 are fixed and have constant total lengths and only the third lens group L3 is independently moved toward the enlargement conjugate side. Also, in order to ensure illuminance on the screen S, a multilayer coat is applied to each lens surface.

The first lens group L1 has a two-lens construction including a negative lens G11 and a negative lens G12 from the enlargement conjugate side. By designing the first lens G11 disposed on the most enlargement conjugate side using a negative lens, an apparent pupil position is set on the enlargement conjugate side and the diameter of a front lens is reduced.

Also, like in the second embodiment, the first lens G11 is a lens which is made of special low dispersion glass "s-FPL51-" (manufactured by Kabushiki Kaisha Ohara) with an Abbe number of 80 or more and whose both surfaces each have an aspherical surface shape. With this construction, it becomes possible to compensate for distortion and the like with efficiency.

The second lens group L2 performs focusing when an object-image distance is changed. With this construction, it becomes possible to realize a zoom lens where even when a throwing distance is changed, less aberration variations occur.

The third lens group L3 and the fourth lens group L4 are the same as the second lens group L2 and the third lens group L3 in the second embodiment.

According to this embodiment, it becomes possible to realize a zoom lens that has a large aperture (F-value=2.0) and high luminance but has less focus movements at the time of magnification changing.

Also, numerical values of Conditional Expressions (1) to (5) in this embodiment are given below.

Conditional Expressions $$\beta_{VW} = -0.91 \quad (1)$$

$$L/f_r = 0.51 \quad (2)$$

$$2 \cdot F_m \cdot \epsilon \cdot |-f_V(1-\sqrt{Z})^2| \cdot \beta_r^2 / \sqrt{Z} = 0.061 \quad (3)$$

$$2 \cdot F_T \cdot \epsilon \cdot |BF_W - BF_T| = 0.060 \quad (4)$$

$$F_m = 2.08 \quad (5)$$

Here, specific values of the variables described above in numerical embodiments are given below.

TABLE 1

|  | FIRST NUMERICAL EMBODIMENT | SECOND NUMERICAL EMBODIMENT | THIRD NUMERICAL EMBODIMENT |
| --- | --- | --- | --- |
| Fm | 1.84 | 1.80 | 2.08 |
| FT | 1.98 | 1.87 | 2.16 |
| ε | 0.028 | 0.028 | 0.028 |
| fv | 47.17 | 44.96 | 43.73 |
| Z | 1.10 | 1.10 | 1.15 |
| βr | 0.459 | 0.493 | 0.511 |
| BFw | 6.604 | 6.591 | 6.601 |
| B = T | 6.604 | 6.591 | 6.601 |

As described above, according to each embodiment, it becomes possible to obtain a zoom lens that favorably corrects various aberrations in an entire magnification changing region, achieves favorable optical performance across the whole of a screen, and is suitable for a liquid crystal projector.

Hereinafter, first to third numerical embodiments corresponding to the first to third embodiments of the present invention will be described. In the numerical embodiments, "i" represents the order of a corresponding optical surface from the enlargement conjugate side. Therefore, "Ri" denotes the radius of curvature of the ith optical surface, "di" denotes the interval between the ith surface and the i+1th surface, and "ni" and "vi" respectively denote the refractive index and the Abbe number of the material of the ith optical member with respect to the d-line.

Also, "f" is a focal distance, "FNO" is an F-number, and "ω" is a half angle of view. The last five optical surfaces are surfaces constituting the glass block.

In the aberration diagrams, "B", "G", and "R" respectively denote 470 nm, 550 nm, and 650 nm and "ΔM" and "ΔS" respectively represent a meridional image surface and a sagittal image surface.

When a displacement in the optical axis direction at a position with a height h from the optical axis is referred to as "X" by setting a surface vertex as a reference, the aspherical surface shape is expressed as follows.

$$x = \frac{(1/R)h^2}{1 + \sqrt{\{1-(1+k)(h/R)^2\}}} + Ah^2 + Bh^4 + Ch^6 + Dh^8$$

Here, "R" is a paraxial radius of curvature, "k" is a conical constant, and "A", "B", "C", "D", and "E" are each an aspherical surface coefficient.

Also, "e-X" means "×10$^{-x}$".

TABLE 2

First Numerical Embodiment
f: 18.8 mm to 20.7 mm FNO: 1.74 to 1.98 ω: 26.82° to 24.67°

|  | R | d | n | ν |
|---|---|---|---|---|
| 1 | ( ) | 1.50 | 1.532 | 55.8 |
| 2 | ( ) | 7.61 | | |
| 3 | −25.913 | 1.50 | 1.705 | 41.2 |
| 4 | 27.000 | 2.35 | | |
| 5 | 37.017 | 3.89 | 1.839 | 37.2 |
| 6 | −46.758 | ( ) | | |
| 7 | 29.129 | 3.13 | 1.792 | 47.4 |
| 8 | 158.399 | 18.90 | | |
| 9 | −18.448 | 1.10 | 1.812 | 25.4 |
| 10 | 181.242 | 0.20 | | |
| 11 | 49.113 | 6.93 | 1.605 | 60.6 |
| 12 | −20.862 | 0.75 | | |
| 13 | ( ) | 2.88 | 1.532 | 55.8 |
| 14 | ( ) | ( ) | | |
| 15 | 38.093 | 4.01 | 1.699 | 55.5 |
| 16 | 1621.356 | 4.05 | | |
| 17 | ∞ | 23.00 | 1.518 | 64.1 |
| 18 | ∞ | 0.44 | 1.502 | 65.0 |
| 19 | ∞ | 0.50 | 1.767 | 65.0 |
| 20 | ∞ | 2.20 | 1.462 | 65.0 |
| 21 | ∞ | | | |

Inter-Group Data

| | W | T |
|---|---|---|
| d6 | 18.22 | 13.71 |
| d14 | 0.74 | 5.26 |

Aspherical Surface Data

| | c(1/r) | k | A | B | C | D |
|---|---|---|---|---|---|---|
| 1 | 4.780e−002 | 7.993e−001 | −2.120e−005 | 6.817e−008 | 1.227e−010 | 4.360e−013 |
| 2 | 8.568e−002 | −2.824e−001 | −2.944e−005 | 8.476e−008 | −5.653e−010 | 1.301e−011 |
| 13 | −2.814e−003 | 5.630e+002 | 1.257e−005 | −7.146e−008 | −1.637e−010 | −2.250e−013 |
| 14 | −1.477e−002 | 1.728e+000 | 6.616e−006 | −2.690e−008 | −2.181e−010 | 5.907e−013 |

TABLE 3

Second Numerical Embodiment
f: 18.8 mm to 20.7 mm FNO: 1.74 to 1.87 ω: 26.81° to 24.67°

|  | R | d | n | ν |
|---|---|---|---|---|
| 1 | ( ) | 1.50 | 1.498 | 81.5 |
| 2 | ( ) | 12.94 | | |
| 3 | −17.752 | 2.00 | 1.699 | 55.5 |
| 4 | 41.406 | 1.21 | | |
| 5 | 44.846 | 4.22 | 1.703 | 48.1 |
| 6 | −27.447 | ( ) | | |
| 7 | 26.107 | 2.67 | 1.776 | 49.6 |
| 8 | 99.214 | 19.72 | | |
| 9 | −15.932 | 1.10 | 1.791 | 25.7 |
| 10 | 124.414 | 0.20 | | |
| 11 | ( ) | 8.29 | 1.696 | 53.2 |
| 12 | ( ) | ( ) | | |
| 13 | 40.202 | 3.46 | 1.699 | 55.5 |
| 14 | 1707.641 | 4.05 | | |
| 15 | ∞ | 23.00 | 1.518 | 64.1 |
| 16 | ∞ | 0.44 | 1.502 | 65.0 |
| 17 | ∞ | 0.50 | 1.767 | 65.0 |
| 18 | ∞ | 2.20 | 1.462 | 65.0 |
| 19 | ∞ | | | |

TABLE 3-continued

Second Numerical Embodiment
f: 18.8 mm to 20.7 mm FNO: 1.74 to 1.87 ω: 26.81° to 24.67°

Inter-Group Data

|     | W     | T    |
| --- | ----- | ---- |
| d6  | 10.70 | 6.42 |
| d12 | 4.77  | 9.05 |

Aspherical Surface Data

|    | c(1/r)     | k           | A           | B          | C           | D          |
|----|------------|-------------|-------------|------------|-------------|------------|
| 1  | 4.911e−002 | 7.993e−001  | −2.120e−005 | 6.817e−008 | 1.227e−010  | 4.360e−013 |
| 2  | 8.558e−002 | −2.824e−001 | −2.944e−005 | 8.476e−008 | −5.653e−010 | 1.301e−011 |
| 11 | 2.459e−002 | −1.242e+001 | 9.684e−006  | 8.015e−009 | −8.876e−011 | 5.887e−013 |
| 12 | −5.652e−002| −3.838e−002 | 8.653e−006  | 4.445e−008 | −3.024e−010 | 1.247e−012 |

TABLE 4

Third Numerical Embodiment
f: 18.6 mm to 21.5 mm FNO: 2.00 to 2.16 ω: 27.01° to 23.86°

|    | r        | d     | nd    | vd   |
|----|----------|-------|-------|------|
| 1  | ( )      | 1.50  | 1.498 | 81.5 |
| 2  | ( )      | 12.85 |       |      |
| 3  | −17.760  | 2.00  | 1.699 | 55.5 |
| 4  | 44.220   | ( )   |       |      |
| 5  | 46.962   | 4.15  | 1.703 | 48.1 |
| 6  | −27.800  | ( )   |       |      |
| 7  | 25.777   | 2.70  | 1.776 | 49.6 |
| 8  | 102.837  | 19.33 |       |      |
| 9  | −15.864  | 1.10  | 1.791 | 25.7 |
| 10 | 116.904  | 0.20  |       |      |
| 11 | ( )      | 8.30  | 1.696 | 53.2 |
| 12 | ( )      | ( )   |       |      |
| 13 | 41.476   | 3.31  | 1.699 | 55.5 |
| 14 | 1649.328 | 4.05  |       |      |
| 15 | ∞        | 23.00 | 1.518 | 64.1 |
| 16 | ∞        | 0.44  | 1.502 | 65.0 |
| 17 | ∞        | 0.50  | 1.767 | 65.0 |
| 18 | ∞        | 2.20  | 1.462 | 65.0 |
| 19 | ∞        |       |       |      |

Inter-Group Data

|     | W     | T     |
| --- | ----- | ----- |
| d4  | 1.15  | 1.15  |
| d6  | 11.20 | 4.99  |
| d12 | 3.84  | 10.04 |

Aspherical Surface Data

|    | c(1/r)      | k           | A           | B          | C           | D          |
|----|-------------|-------------|-------------|------------|-------------|------------|
| 1  | 4.911e−002  | 7.993e−001  | −2.120e−005 | 6.817e−008 | 1.227e−010  | 4.360e−013 |
| 2  | 8.577e−002  | −2.824e−001 | −2.944e−005 | 8.476e−008 | −5.653e−010 | 1.301e−011 |
| 11 | 2.574e−002  | −1.200e+001 | 9.540e−006  | 7.236e−009 | −9.283e−011 | 5.912e−013 |
| 12 | −5.679e−002 | −4.315e−002 | 8.900e−006  | 4.606e−008 | −3.042e−010 | 1.231e−012 |

FIG. 7 is a schematic view showing a main portion of an embodiment where the zoom lens according to the present invention is used.

In the drawing, an image projection apparatus is shown in which the zoom lens described above is applied to a three-panel color liquid crystal projector, image information of light in multiple colors based on multiple liquid crystal display elements is synthesized through a color synthesis means, and magnification and projection onto the screen surface is performed using the zoom lens. In FIG. 7, a color liquid crystal projector 1 synthesizes light in respective colors of RGB from three liquid crystal panels 5B, 5G, and 5R for RGB into one optical path using a prism 2 serving as the color synthesis means (the present invention is not limited to the synthesis using one prism and the color synthesis may be performed using multiple dichroic mirrors, dichroic prisms, or multiple polarizing beam splitters) and throws the synthesized light onto a screen 4 using a throwing lens 3 composed of the zoom lens described above. Here, it does not matter whether the liquid crystal display elements are transmission-type liquid crystal display elements or reflection-type liquid crystal display elements. Also, there occurs no problem even when only one liquid crystal display element is used. Further, the liquid crystal display elements may be changed into mirror devices such as DMDs.

Also, in this embodiment, a construction has been described in which only one lens group is moved at the time of magnification changing, however as a matter of course, two lens groups adjacent to each other or two lens groups separated from each other may be moved integrally.

According to the embodiment described above, it becomes possible to obtain a zoom lens that favorably corrects various aberrations in an entire magnification changing region using a simple lens construction, achieves favorable optical performance across the whole of a screen, and is suitable for a projection optical system of a liquid crystal projector or the like.

This application claims priority from Japanese Patent Application No. 2004-112550 filed Apr. 6, 2004, which is hereby incorporated by reference herein.

What is claimed is:

1. A zoom lens comprising:
plurality of lens units
wherein magnification change is performed by moving only one lens unit among the plurality of lens units,
focus adjustment of the zoom lens is performed by moving one of a first lens unit and a second lens unit counted from an enlargement conjugate side among the plurality of lens units, and
the zoom lens is approximately telecentric on reduction conjugate side of the zoom lens,
wherein the plurality of lens units include a first lens unit having negative refractive power, a second lens unit having positive refractive power, a third lens unit having positive refractive power, and a fourth lens unit having positive refractive power in this order from an enlargement conjugate side,
wherein the magnification changing is performed by moving only the third lens unit in an optical axis direction of the zoom lens,
wherein focus adjustment is performed by moving the second lens unit on an optical axis,
wherein when a focal distance of the third lens unit is referred to as "$f_V$" and a lateral magnification, a magnification changing ratio, an F-value in an intermediate region at a time of the magnification changing, and a minimum diameter of a circle of confusion of the fourth lens unit are respectively referred to as "$\beta_r$", "Z", "$F_m$", and "$\epsilon$", a following expression is satisfied:

$2F_m \cdot \epsilon - |-f_V(1-\sqrt{Z})^2| \cdot \beta_r^2/\sqrt{Z} > 0.$

2. A zoom lens according to claim 1, wherein the plurality of lens units include an aspherical lens made of plastic.

3. A zoom lens according to claim 1, wherein the plurality of lens units include one or more lenses made of glass whose Abbe number is 80 or more.

4. A zoom lens according to claim 1, wherein a position of the third lens unit at a tele photo end is on the enlargement conjugate side with respect to a position of the third lens unit at a wide angle end.

5. A zoom lens according to claim 1, wherein when an imaging magnification at a magnification changing position at a wide angle end of the third lens unit is referred to as "$\beta_{VW}$", a following expression is satisfied:

$-1.2 < \beta_{VW} < -0.8$

6. An image projection apparatus comprising:
an image display element; and
a zoom lens for projecting light from the image display element,
wherein the zoom lens comprises plurality of lens units,
magnification change is performed by moving only one lens unit among the plurality of lens units,
focus adjustment of the zoom lens is performed by moving one of a first lens unit and a second lens unit counted from an enlargement conjugate side among the plurality of lens units, and
the zoom lens is approximately telecentric on reduction conjugate side of the zoom lens,
wherein the plurality of lens units include a first lens unit having negative refractive power, a second lens unit having positive refractive power, a third lens unit having positive refractive power, and a fourth lens unit having positive refractive power in this order from an enlargement conjugate side,
wherein the magnification changing is performed by moving only the third lens unit in an optical axis direction of the zoom lens,
wherein focus adjustment is performed by moving the second lens unit on an optical axis,
wherein when a focal distance of the third lens unit is referred to as "$f_V$" and a lateral magnification, a magnification changing ratio, an F-value in an intermediate region at a time of the magnification changing, and a minimum diameter of a circle of confusion of the fourth lens unit are respectively referred to as "$\beta_r$", "Z", "$F_m$", and "$\epsilon$", a following expression is satisfied:

$2F_m \cdot \epsilon - |-f_V(1-\sqrt{Z})^2| \cdot \beta_r^2/\sqrt{Z} > 0.$

7. A zoom lens comprising:
a plurality of lens units, wherein:
a pupil on a reduction conjugate side of the zoom lens is located at approximately infinity;
magnification changing is performed by moving only one lens unit for magnification changing among the plurality of lens units in an optical axis direction of the zoom lens; and
when an imaging magnification at a magnification changing position at a wide angle end of the lens unit for magnification changing is referred to as "$\beta_{VW}$", a focal distance of the lens unit for magnification changing is referred to as "$f_V$", and a lateral magnification, a magnification changing ratio, an F-value in an intermediate region at a time of the magnification changing, and a minimum diameter of a circle of confusion of a last lens unit are respectively referred to as "$\beta_r$", "Z", "$F_m$", and "$\epsilon$", following expressions are satisfied:

$-1.2 < \beta_{VW} < -0.8$ $2F_m \cdot \epsilon - |-f_V(1-\sqrt{Z})^2| \cdot \beta_r^2/\sqrt{Z} > 0.$ 8. A zoom lens according to claim 7, wherein:
the plurality of lens units include one or more plastic lenses that each have a surface in an aspherical surface shape; and the plurality of lens unit include one or more lenses that are each made of glass whose Abbe number is 80 or more.

9. An image projection apparatus comprising:
an image display element; and
a zoom lens that projects light from the image display element, wherein:
the image display element is disposed on a reduction conjugate side of the zoom lens;
the zoom lens includes a plurality of lens units;
a pupil on the reduction conjugate side of the zoom lens is located at approximately infinity;
magnification changing is performed by moving only one lens unit for magnification changing among the plurality of lens units on an optical axis; and
when an imaging magnification at a magnification changing position at a wide angle end of the lens unit for magnification changing is referred to as "$\beta_{VW}$", a focal distance of the lens unit for magnification changing is referred to as "$f_V$", and a lateral magnification, a magnification changing ratio, an F-value in an intermediate region at a time of magnification changing, and a minimum diameter of a circle of confusion of a last lens unit are respectively referred to as "$\beta_r$", "$Z$", "$F_m$", and "$\epsilon$", following expressions are satisfied:

$$-1.2 < \beta_{VW} < -0.8$$

$$2F_m \cdot \epsilon - |-f_{V'}(1-\sqrt{Z})^2| \cdot \beta_r^2 / \sqrt{Z} > 0.$$

10. A zoom lens comprising:
three or more lens units, wherein:
magnification changing is performed by moving only one lens unit for magnification changing among the three or more lens units in an optical axis direction of the zoom lens; and
when an imaging magnification at a magnification changing position at a wide angle end of the lens unit for magnification changing is referred to as "$\beta_{VW}$", a focal distance of the lens unit for magnification changing is referred to as "$f_V$", and a lateral magnification, a magnification changing ratio, an F-value in an intermediate region at a time of the magnification changing, and a minimum diameter of a circle of confusion of a last lens unit are respectively referred to as "$\beta_r$", "$Z$", "$F_m$", and "$\epsilon$", following expressions are satisfied:

$$-1.2 < \beta_{VW} < -0.8$$

$$2F_m \cdot \epsilon - |-f_{V'}(1-\sqrt{Z})^2| \cdot \beta_r^2 / \sqrt{Z} > 0.$$

11. A zoom lens according to claim 10, wherein a pupil on a reduction conjugate side is located at approximately infinity.

12. An image projection apparatus comprising:
an image display element; and
a zoom lens that projects light from the image display element, wherein:
the image display element is disposed on a reduction conjugate side of the zoom lens;
the zoom lens includes three or more lens units;
magnification changing is performed by moving only one lens unit for magnification changing among the three or more lens units; and
when an imaging magnification at a magnification changing position at a wide angle end of the lens unit for magnification changing is referred to as "$\beta_{VW}$", a focal distance of the lens unit for magnification changing is referred to as "$f_V$", and a lateral magnification, a magnification changing ratio, an F-value in an intermediate region at a time of magnification changing, and a minimum diameter of a circle of confusion of a last lens unit are respectively referred to as "$\beta_r$", "$Z$", "$F_m$", and "$\epsilon$", following expressions are satisfied:

$$-1.2 < \beta_{VW} < -0.8$$

$$2F_m \cdot \epsilon - |-f_{V'}(1-\sqrt{Z})^2| \cdot \beta_r^2 / \sqrt{Z} > 0.$$

* * * * *